United States Patent [19]
Winckler et al.

[11] 3,802,293
[45] Apr. 9, 1974

[54] POWER SHIFT

[75] Inventors: Peter S. Winckler, Birmingham;
Elmer A. Richards, Oshtemo, both of Mich.

[73] Assignee: Eaton Corporation, Cleveland, Ohio

[22] Filed: Aug. 28, 1972

[21] Appl. No.: 284,163

[52] U.S. Cl.......................... 74/745, 74/331, 74/740
[51] Int. Cl. ...... F16h 3/02, F16h 3/08, F16h 37/00
[58] Field of Search............................. 74/331, 745

[56] References Cited
UNITED STATES PATENTS
3,508,450   4/1970   Richards............................. 74/340
3,362,245   1/1968   Francuch et al.................. 74/745 X

*Primary Examiner*—Arthur T. McKeon
*Attorney, Agent, or Firm*—Woodhams, Blanchard and Flynn

[57] ABSTRACT

A ratio shifting means including positive drive means operable during a shifting operation. The ratio shifting means is adapted particularly for automotive use and includes means for bypassing a shift location to provide positive drive means around the ratio gears for effecting a continuous and positive mechanical connection between the input and output of a transmission system during a ratio shifting operation.

18 Claims, 9 Drawing Figures

POWER SHIFT

FIELD OF THE INVENTION

This invention relates to a ratio shifting means, particularly for automotive use, wherein there is provided mechanically possitive drive means bypassing selected shiftable gears for effecting positive drive through a transmission system during shifting of such gears.

BACKGROUND OF THE INVENTION

While the particular problem giving rise to the invention arose out of the automotive field, and the invention devised to meet such problem has been devised primarily in an automotive context, it will be recognized that same is applicable to a variety of other circumstances. However, inasmuch as the problem giving rise to the invention arose in the automotive field, it will be hereinafter discussed as to both problem and solution in terms of automotive use. It will be recognized, however, that the discussion hereinafter directed to automotive use is for illustrative purposes only and is not intended to be limiting. The invention is applicable to a variety of ratio shifting means, however applied, between a power source and a load and the invention shall be understood accordingly.

The provision of ratio shifting means between a power source and a mechanical load is at least as old as automotive devices and, particularly in connection with heavy duty loads, has created a continuing problem. In a rather light passenger car ratio shifting device, it is entirely feasible to use means which momentarily effect a break in the power train inasmuch as the inertia of the vehicle will normally continue the velocity of the vehicle substantially undiminished for a long enough period of time to enable the shift means to progress successfully through the shift sequence. This is well known and needs no elaboration. However, where a heavy duty application is involved, a very different set of requirements is present. In the first place, it now becomes entirely impractical to rely upon the inertia of the vehicle for more than an extremely short period of time for maintaining the movement of the vehicle and thereby making possible a shift which requires a momentary break in the power train. While this is possible to a limited degree in some such operations, such as in many kinds of over-the-highway truck operations, the problem is more serious where the load is in the nature of a truck moving uphill, or in off-highway uses such as in connection with earth movers. In these last-mentioned operations, the inertia of the vehicle is entirely inadequate to keep the system in motion and other means must be provided to effect ratio shifting between the power source and the load.

In previous apparatus of this type, there has been utilized both ratio shifting devices having positive gearing components and ratio shifting devices utilizing fluid connections, such as torque converters. However, where the loads are heavy as above-mentioned, devices utilizing positively engaging components are often unable to shift quickly enough to effect a ratio change and the industry has had to rely in many cases on fluid devices, or devices containing a fluid power transmission component, to effect the desired ratio change.

Inasmuch as ratio changing devices utilizing positive power transmission components, such as spur or helical gears, are desired from the standpoint of efficiency and ease of maintenance, it has long been desirable to provide if possible ratio changing means utilizing such possitive transmission devices throughout the entire power train and yet be capable of shifting under heavy loads, such as where a truck is going uphill or in off-highway service, such as in earth movers. Many devices have been proposed for this purpose, which devices in the past have mainly gone in the direction of larger and heavier synchronizers in order to facilitate the desired shifting operation, or have gone in the direction of devices for minimizing the time during which the power train remains open. Examples of shift or synchronization aiding devices are already well-known and examples of devices for minimizing shifting time are U.S. Pat. Nos. 2 943 502 and 2 943 719. However, the devices of these patents were too complex to be successful and the use of extremely heavy synchronizers is too expensive. Hence the problem still remains of providing a transmission device for effecting ratio shifting between the power source and the load, which device utilizes positive mechanical power transmission devices from the power source to the load and which can effect a successful ratio change under conditions of slow speed and heavy load.

While in an ordinary unit transmission the foregoing described problem is serious, in the range shifting type of transmission, such as represented by U.S. Pat. Nos. 2 637 221 and 3 105 395, there is present a main transmission unit in series connection with a range shifting transmission unit whereby the main transmission unit is caused to progress through all or most of its shifting sequence while the range shifting transmission unit is in one position and then, with the range transmission unit in another position, the main transmission unit is caused to progress a second time through all, or almost all, of its available sequence. This type of transmission poses a special problem in that a double shift occurs when the range shifting transmission unit is moved from one position to another and at the same time the main transmission unit is moved from one end of its shift pattern to the other end thereof. This simultaneous shift, sometimes called a "double swap" shift, inevitably requires an amount of time for the completion thereof which is normally not available under conditions of low speed and high loads. Therefore, while transmissions having a main transmission unit in tandem with a range shifting transmission unit, as above-mentioned, have had an extremely high level of commercial success, it is still desirable to improve the applicability of transmission means of this type to conditions of heavy load and slow speed, such as for certain very heavy trucks, military vehicles or off-highway vehicles, were it is not feasible to break the power train, at least for more than a virtually immeasurable instant, during such a "double swap" shifting operation.

Accordingly, it is an object of the present invention to provide:

1. A transmission device capable of effecting ratio shifting between a power source and a load under conditions of slow speed and heavy load.

2. A device, as above-mentioned, having positive mechanical power transmission from the source to the load continuously, or virtually so, throughout the entire ratio changing sequence.

3. A device, as above-mentioned, utilizing positive mechanical power transmission devices such as spur or helical gears in the ratio changing means together with devices that positively mechanically bypass selected ratio gears during a "double swap" ratio shift.

4. A device, as aforesaid, which is particularly adaptable to a transmission which includes a main transmission unit having a plurality of relatively close shiftable ratios and a series connected range shift transmission unit having at least two relatively widely spaced ratios.

5. A device, as aforesaid, in which a positive mechanical bypass drive is provided for connecting the power source to the load during a "double swap" shift sequence between the main transmission unit and the range transmission unit.

6. A device, as aforesaid, which may utilize at least in its range shifting portion a twin countershaft transmission somewhat of the type illustrated in U.S. Pat. No. 3 105 395, and particularly wherein the advantages obtainable from the range shifting portion of the transmission of said patent can be maintained undiminished while obtaining the advantages of a power bypass as set forth above.

7. A device, as aforesaid, which may have a large number of parts which are interchangeable with the apparatus of U.S. Pat. Nos. 3 105 395 and 3 335 616, presently being manufactured, and thereby still further minimize the manufacturing cost of the new device.

8. A device, as aforesaid, which with respect to the novel portions will still be of sufficient simplicity that it can be tooled and placed in production at a minimum of expense.

9. A device, as aforesaid, which can be manufactured and assembled by relatively simple tooling.

Other objects and purposes of this invention will be apparent to persons acquainted with apparatus of this general type upon reading the following disclosure and inspecting the accompanying drawings.

Certain terminology will be used in the following description for convenience in reference only and will not be limiting. The words "upwardly," "downwardly," "leftwardly" and "rightwardly" will refer to directions in the drawings to which reference is made. The words "front" and "rear" will be used relative to the input and output ends, respectively, of the transmission. The words "inwardly" and "outwardly" will refer to directions toward and away from, respectively, the geometric center of the device and designated parts thereof. Said terminology will include the words above specifically mentioned, derivatives thereof, and words of similar import.

SUMMARY OF THE INVENTION

Briefly, the objects and purposes of the present invention are met by providing a transmission having a main transmission unit and a range shift transmission unit connected in series, and wherein the transmission additionally includes bypass means for effecting continuous positive mechanical power transmission from the power source to the load during preferably all portions of the transmission shifting sequence, and particularly during the "double swap" portion of the shifting sequence, or at least for effecting such power transmission during sufficiently near to all portions of the shifting sequence that any open moments will be either insignificant or can be used advantageously. The bypass means is connected between the input and output of the transmission and includes clutch means capable of effecting continuous power transmission from the source to the load during shifting. The bypass means utilizes, in one preferred embodiment, a dog-tooth clutch, for effecting positive driving of the shiftable components during the "double swap" portion of the shifting sequence when the shifting sequence progresses properly, which clutch also has the capability of racheting the dog-tooth clutch teeth as the parts approach synchronism, thereby protecting the parts from the shock and possible breakage which would occur if the clutch teeth were permitted to engage too early.

In the illustrated transmission apparatus, the power bypass is placed externally of the remainder of the shifting system for convenience in illustration and for convenience in the manufacture of the prototype from which the drawings were taken. However, it should be fully recognized that other embodiments are possible and are contemplated including one in which the power bypass is incorporated physically within the remainder of the shifting system so that a minimum of space and components are required.

DETAILED DESCRIPTION

Figure 3:
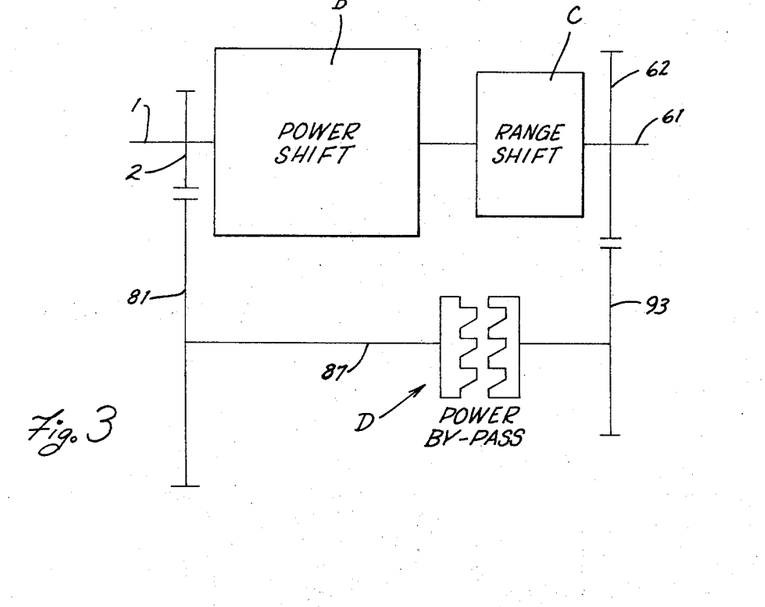
FIG. 3 is a schematic blocklike diagram of a plural unit transmission incorporating therein the power bypass arrangement of the present invention.

Considering first FIG. 3, there is schematically illustrated therein a transmission A connected between an input shaft 1 and an output shaft 61. The transmission A is of conventional type, known embodiments being broadly shown in the above-mentioned U.S. Pat. Nos. 2 637 221 and 3 105 395, among others, and includes a power shift section B, commonly referred to as a main transmission unit, connected in series with a range shift unit C. The range shift unit C commonly includes a pair of alternately connectible power paths of substantially different speed ratios to thus multiply the number of possible speed ratios obtainable by the overall transmission A. The main transmission unit B generally contains therein a large number of parallel power paths of different speed ratios, which power paths all contain different ratio gears therein to permit development with suitable shift mechanisms of a large number of different speed ratios. For example, in a transmission such as illustrated in the remaining figures to be described hereinafter, the main transmission unit B is provided with six power paths having speed ratios of 1.00, 1.28, 1.64, 2.11, 2.70 and 3.47 and the range unit C is provided with a speed ratio of 3.47 when in the low range position, and a speed ratio of 1.00 when in the high range position. According to the present invention, the transmission A is provided with a power bypass which, in the illustration of FIG. 3, includes an additional countershaft 87 connected to the input shaft by intermediate gears 2 and 81, and connected to the output shaft 61 by intermediate gears 62 and 93. The power bypass specifically includes a releasable power transmitting device D, which may be any convenient power-stop means here illustrated as a dog-tooth clutch, for permitting transmission and interruption of power flow between the input and output shaft when the range unit C is being shifted. In carrying out the present invention, it should be noted that the difference in the speed ratios in the range section is substantially the same as the difference between the upper and lower speed ratios in the main transmission unit, the importance of which will be explained in greater detail hereinafter.

Figure 1:
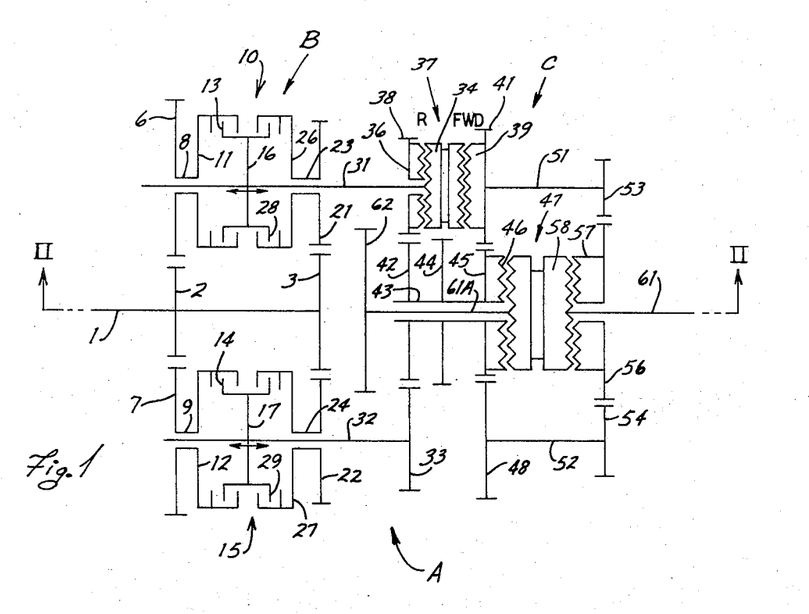
FIG. 1 is a schematic view illustrating a section of a multiple unit transmission incorporating therein one embodiment of the invention, such schematic view being taken on a section through two of the countershafts contained in the main transmission unit.

Considering now in greater detail the structure of the transmission A, and referring first to FIG. 1, there is shown the input shaft 1 driving input gears 2 and 3 which are arranged rotatable therewith. The low-speed input gear 2 drives countershaft gears 6 and 7 which are of equal size and are mounted for rotation on and with the shafts 8 and 9, respectively. The shafts 8 and 9 are connected to suitable power stop means 10 and 15, such as conventional friction clutches, which here include the friction clutch halves 11 and 12, respectively, said clutch halves 11 and 12 being adapted for cooperation with further clutch halves 13 and 14. Clutches such as 10 and 15 are well known in the art and they are schematically shown and described here as having movable clutch slider 16 and 17 to simplify the description. However, in a more typical clutch the sliding portion will be recognized to be only one set of plates, as the plates 13 or 14, and such a clutch is shown and described in more detail in connection with FIG. 5 to insure a full disclosure. Thus, the clutch halves 13 and 14 are schematically shown as respectively mounted on such movable clutch sliders 16 and 17 and will for convenience be so referred to hereinafter, but this schematicized showing and reference will be understood as for convenience only.

The input gear 3 is in driving mesh with further countershaft gears 21 and 22 which are also of equal size and are mounted on and for rotation with the shafts 23 and 24, respectively. Said last-named shafts are rotatable with further clutch halves 26 and 27, respectively, which are arranged for coaction with the rightward halves 28 and 29 of the clutch sliders 16 and 17, respectively. Thus, leftward movement of the clutch sliders 16 and 17 will connect the shafts 8 and 9 therewith, whereas rightward movement of said clutch sliders will connect the shafts 23 and 24 therewith. The clutch sliders 16 and 17 are mounted respectively on and for rotation with countershafts 31 and 32 which are substantially parallel to the input shaft 1.

The shaft 31 is connected to a forward-reverse clutch 37 which, in the illustrated embodiment, is a double dog-clutch for permitting the rotational direction of the transmission output shaft 61 to be either in the forward or reverse direction. The clutch 37 specifically includes a slidable, double dog-clutch member 34 nonrotatably connected to the shaft 31 and having suitable teeth on the leftward side thereof engageable with a cooperating toothed clutch portion 36, which in turn is connected to a gear 38 which is coaxial with but rotatably supported on the shaft 31. The dog-clutch member also has a further toothed portion on the rightward side thereof for coaction with a further toothed clutch portion 39, which in turn is connected to a further gear 41. The gear 38 is disposed in continuous meshing engagement with an intermediate idler gear 114 (FIG. 4), which in turn continuously meshes with a further gear 42 mounted on and for rotation with a shaft 43. The shaft 32 also has a gear 33 nonrotatably connected thereon, which gear 33 is also disposed in meshing engagement with the gear 42.

The shaft 43 also has nonrotatably mounted thereon further coaxially aligned gears 44 and 45 as well as a clutch component 46 of a double dog-clutch 47. The gear 45 is continually meshed with the gear 41 as well as with a further gear 48, which gears are mounted on and for rotation with the parallel countershafts 51 and 52, respectively. The shafts 51 and 52 have gears 53 and 54, respectively, nonrotatably mounted thereon and disposed in continuous meshing engagement with a further gear 56. The gear 56 is nonrotatably connected to the rightward clutch portion 57 of dog-clutch 47, which dog-clutch 47 also includes a slideable double dog-clutch member 58 which is shiftable so as to be alternately engageable with the clutch portions 46 and 57. The dog-clutch member 58 is mounted for rotation with and is axially slideably mounted on the output shaft 61, which output shaft 61 is coaxial with the shaft 43. The leftward end 61A of the output shaft 61 is concentric with the shaft 43 and has a further gear 62 nonrotatably connected thereto for a purpose to be described hereinafter.

Figure 2:
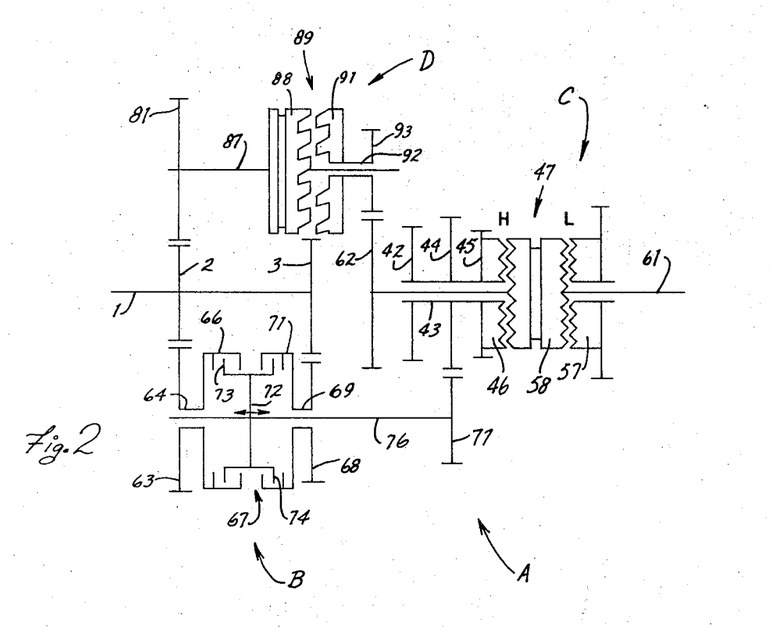
FIG. 2 is a sectional schematic view of the transmission illustrated in FIG. 1, same being taken on a plane substantially perpendicular to the plane of FIG. 1 and positioned on the line II—II of FIG. 1.

Turning now to FIG. 2, there is illustrated a further countershaft system for providing the main transmission unit with further ratio speeds. There is additionally provided a further gear 63 disposed in meshing engagement with the input gear 2. Gear 63 is equal in size to the aforementioned gears 6, 7. The gear 63 is mounted on and for rotation with the shaft 64, which shaft in turn supports one side 66 of a double friction clutch system 67. A further gear 68 is coaxially aligned with the gear 63 and is disposed in continuous meshing engagement with the other input gear 3. The gear 68 is mounted on and for rotation with the further shaft 69 which in turn supports the rightward side 71 of the clutch system 67. Gear 68 is equal in size to the aforementioned gears 21, 22. The clutch system 67 is conventional and is here schematically shown as including a slider 72 having coacting clutch sides 73 and 74 thereon disposed for coaction with the clutch sides 66 and 71, respectively. The sliding portion 72 is nonrotatably mounted on and connected to a further countershaft 76 whereby leftward movement of slider 72 will thus drivingly connect shaft 67 to shaft 76, whereby rightward movement of slider 72 will drivingly connect shaft 69 to shaft 76. In the illustrated embodiment, the shafts 64 and 69 are mounted on and for rotation with respect to the shaft 76, which shaft at its rightward end has a further gear 77 nonrotatably mounted thereon. The gear 77 is in turn disposed in continuous meshing engagement with the above-mentioned gear 44.

All of the foregoing, while not wholly conventional, is nevertheless a multi-countershaft transmission having a multispeed main transmission unit connected in series with a multispeed range shift transmission unit to thus substantially increase the number of speed ratios obtainable through the transmission. The main transmission unit, as described above, specifically includes the countershafts 31, 32 and 76, each of which has a double friction clutch unit associated therewith so that the main transmission unit basically comprises a six-speed unit. The range transmission unit, which is connected in series with the main transmission unit, includes therein the countershafts 51 and 52 and the range shift clutch 47 so that the range unit is thus basically a two-speed unit. Both the range unit and main unit are relatively conventional and thus may be freely modified as desired without departing from the substance of the present invention. However, the particular arrangement herewith described is particularly advantageous in connection with the invention and is suitable for an effective attainment of the objectives of the invention, particularly the ones above-expressed and others equally contemplated.

Turning now to the apparatus which in the present embodiment particularly comprises the essential feature of the present invention, and particularly referring to FIG. 2, there is shown a gear 81 disposed in continuous mesh with the input gear 2 and mounted on and for rotation with a further shaft 87 which is parallel to the input shaft 1. Gear 81 is equal in size to the aforementioned gears 6, 7, and 63. The shaft 87 also carries thereon one side 88 of a conventional power-stop device, here the dog-tooth clutch system 89. The other side 91 of the clutch system 89 is mounted on and for rotation with a shaft 92, which in turn is mounted on and for rotation with respect to the shaft 87. The shaft 92 has a gear 93 fixedly secured thereto and disposed in continuous meshing engagement with the above-mentioned output gear 62.

The shafts 87 and 92. as above-described, thus basically comprise a bypass for connecting the input shaft 1 to the output shaft 61 to thus permit continuous power transmission therebetween when the clutch system 89 is engaged. For this purpose, the clutch system 89 is caused to engage by means of a suitable shift control system (not shown), such as by means of a pneumatic shift control circuit. The teeth on the clutch members 88 and 91, also illustrated in FIG. 3, are preferably provided with a sloped or angled surface on one side thereof to thus permit the members to ratchet relative to one another when the member 91 is rotating at a speed greater than the rotation of the member 88. The opposite sides of the teeth, however, are formed either with perpendicular or locking type sides thereon to thus cause the members 88 and 91 to lockingly engage when the members 88 and 91 have synchronized and thus moved into meshing engagement with one another. This structure, and the manner in which it coacts with the overall transmission, will be described in greater detail hereinafter.

Figure 4:
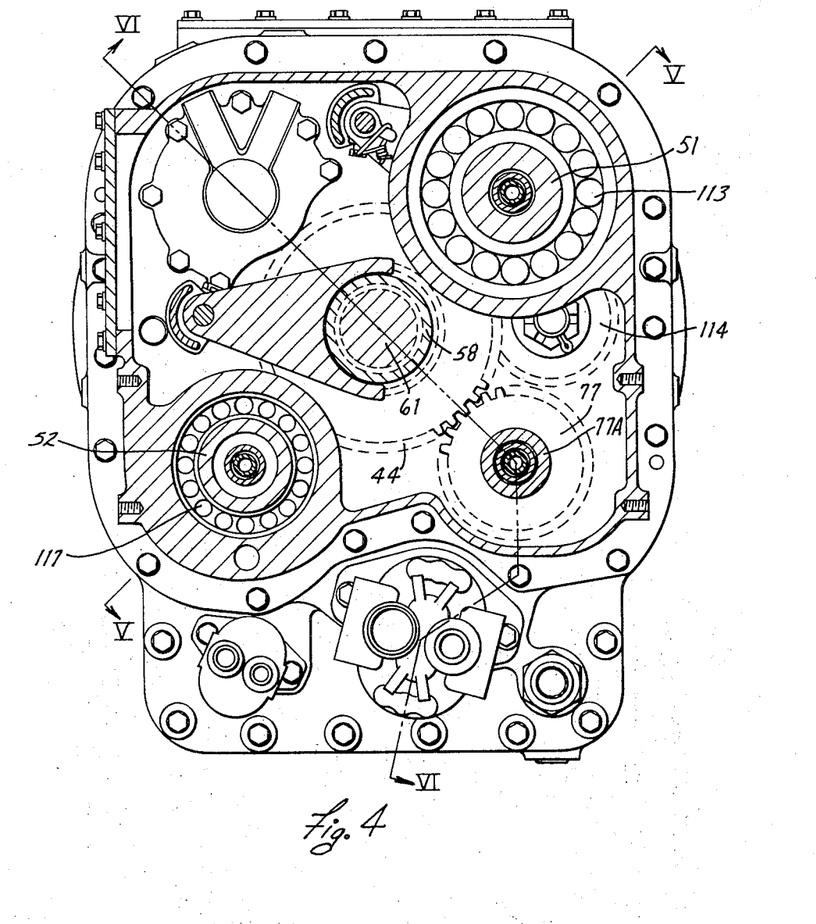
FIG. 4 is a transverse elevational view of a transmission constructed according to the present invention, same being illustrated in section and taken substantially along the line IV-IV of FIG. 5.
Figure 5:
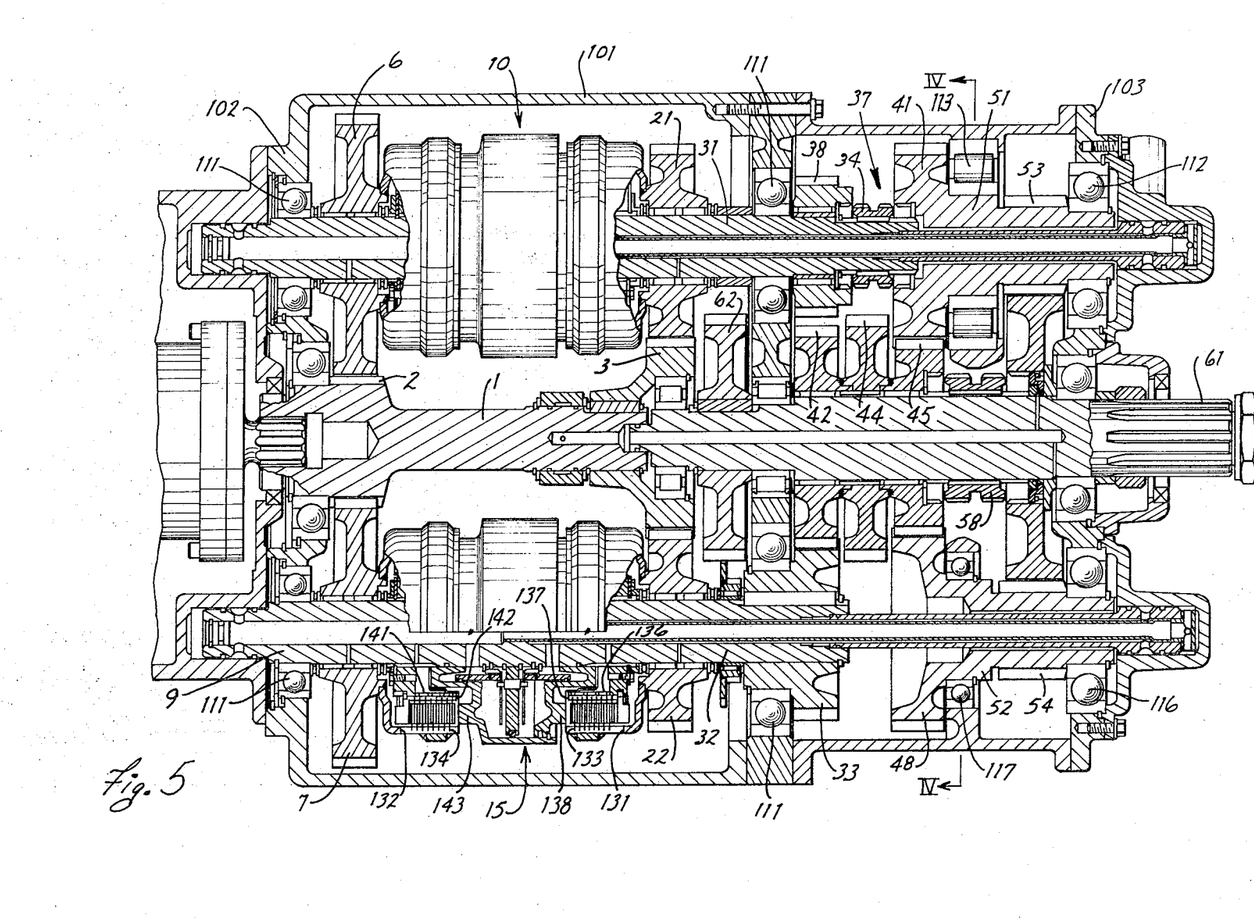
FIG. 5 is a longitudinal sectional view taken substantially along the line V—V of FIG. 4, and corresponding to the schematic view illustrated in FIG. 1.
Figure 6:
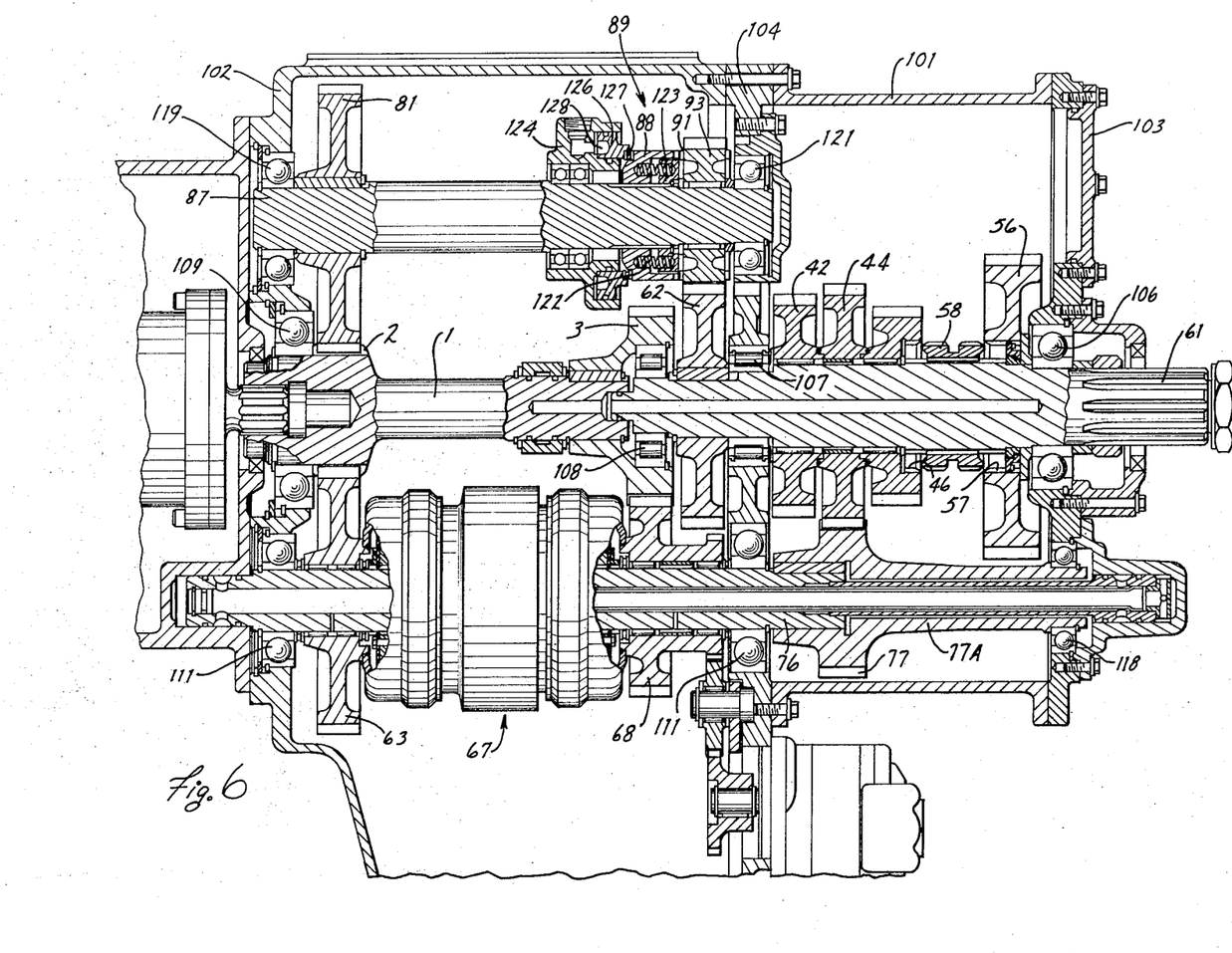
FIG. 6 is a longitudinal sectional view taken substantially along the line VI—VI of FIG. 4, and corresponding to the schematic view illustrated in FIG. 2.

Turning now to FIGS. 4-6, it will be recognized that the gear systems set forth therein are more complete illustrations of the gear systems schematically set forth above in FIGS. 1 and 2. Thus, in FIGS. 4-6 the numerals corresponding to those already described in connection with FIGS. 1 and 2 will be understood to refer to parts already described. In addition, however, FIGS. 4-6, in view of their more complete detail, show additional features which will now be briefly described.

In FIGS. 4-6, there is shown a transmission constructed according to the schematic illustrations illustrated in FIGS. 1 and 2 and specifically including both a main transmission section and range shift section disposed within a housing 101 having opposite end walls 102 and 103 and an intermediate wall 104. The range shift section is primarily located between the walls 103 and 104 and the output shaft 61 extends between and is rotatably supported on the walls 103 and 104 by means of conventional antifriction bearings 106 and 107, respectively. The front end of the output shaft 61 extends into the region of the main transmission unit, as located between the walls 102 and 104, and a further anti-friction bearing 108 is mounted thereon and is disposed within and rotatably supports thereon the gear 3, which gear is in turn nonrotatably secured to the rear end of the input shaft 1. The front end of the input shaft 1 is supported on a further anti-friction bearing 109 located within the end wall 102.

The main transmission unit further includes the three countershafts 31, 32 and 76, which shafts all extend between the walls 102 and 104 and are rotatably supported thereon by conventional anti-friction bearings 111. EAch of the countershafts has a conventional double, friction-type plate clutch associated therewith, namely the clutch systems 10, 15 and 67 illustrated in FIGS. 1 and 2.

While functionally these clutch systems have already been described in connection with FIGS. 1 and 2, and within the scope of such function they may be of any conventional type, the particular clutches here utilized and illustrated comprise a shell 131 affixed to and rotatable with the gear 22 and a shell 132 affixed to and rotatable with the gear 7. A plurality of clutch plates 133 are slidingly but nonrotatably associated with the shell 131 and a plurality of clutch plates 134 are slidingly but nonrotatably associated with the shell 132. An inner plate carrier 136 is affixed to and rotatable with the shaft 32 and carries nonrotatably but slidably associated therewith the clutch plates 137 suitably interleaved with the clutch plates 133. A conventional clutch actuator 138 is slidably mounted on for rotation with the shaft 32 and is actuated in any convenient manner when energized to compress said two sets of plates together whereby the friction therebetween will establish a rotative connection between the part 131 and 136 and thereby between the gear 22 and shaft 32.

Similarly, a plate carrier 141 is mounted on for rotation with the shaft 32 and an inner set of clutch plates 142 is slidably but nonrotatably mounted thereon and interleaved with the clutch plates 134. The clutch actuator 143 is actuated in any convenient, conventional manner for leftward movement to contact and compress said clutch plates in the usual, known manner and cause them to grip together and thereby rotatably connect the parts 132 and 141 which in turn will rotatably connect the gear 7 to the shaft 32. The clutches 10 and 67 may be identical with the clutch 15 and need no independent description.

It will be evident from the foregoing that the clutch half 12, for example, corresponds functionally to the shell 132 and plates 134 whereas the clutch half 27 corresponds functionally to the shell 131 and plates 133. Similarly the slider 17 when moving leftwardly as seen in FIG. 1 corresponds functionally to the carrier 141 and clutch plates 142 together with the slider 143 by which compression of the plates is accomplished and the slider 17 when moving rightwardly and taken with the clutch half 29 corresponds functionally to the carrier 136 and the inner clutch plates 137 together with the compression means 138. The other clutches are similar.

The rearward ends of the countershafts extend beyond the intermediate wall 104 into the range shift section. The rear end of countershaft 31 has the foward-reverse clutch system 37 associated therewith, which here includes the shiftable clutch collar 34 slidably but nonrotatably mounted on the shaft 31 and shiftable into engagement with the forward gear 41 or the reverse gear 38. The range gears 41 and 53 are fixedly interconnected by the immediate shaft 51 which is coaxially aligned with the countershaft 31 and is rotatably supported on the housing 101 by bearings 112 and 113. The reverse gear 38 is rotatably supported on the countershaft 31 and is disposed in continuous meshing engagement with the intermediate idler gear 114 (FIG. 4), which in turn is in continuous meshing engagement with the gear 42 which is rotatably supported on the output shaft 61.

The countershaft 32, like the shaft 31, also extends into the range section of the transmission and has the gear 33 nonrotatably secured to the rearward end thereof, which gear is continuously meshed with the further gear 42 which is rotatably supported on the output shaft 61. The countershaft 32 is also substantially coaxially aligned with the countershaft 52 of the range section, which countershaft is rotatably supported on the housing by anti-friction bearings 116 and 117.

In a similar manner, the remaining countershaft 76 (FIG. 6) also extends into the range section and has the gear 77 nonrotatably secured thereto. The gear 77 has a shaft portion 77A fixedly secured thereto and extending substantially coaxially with the countershaft 76. The shaft portion 77A extends across the range section and is rotatably supported on the end wall 103 by an anti-friction bearing 118.

Considering now the power bypass (see FIG. 6), same here includes the countershaft 87 disposed within the main transmission unit and extending between the walls 102 and 104, being rotatably supported thereon by conventional antifriction bearings 119 and 121. The gear 81 is fixedly secured to the power bypass shaft 87 adjacent one end thereof, and the gear 93 is rotatably supported on the bypass shaft 87 adjacent the other end thereof. The ratio relationship of these gears will be dealt with further hereinafter.

The bypass clutch 89, in the illustrated embodiment, here includes the first clutch member 88 which is nonrotatably but axially slidably mounted on the shaft 87, such as by being splined thereto. The clutch member 88 has ratchet-type teeth on the rearward axial end thereof which are disposed opposite similar ratchet teeth 91 which, in the illustrated embodiment, are formed integral with gear 93. The clutch member 88 is normally resiliently urged away from the teeth 91 by means of compression springs 122 which are disposed between the clutch member 88 and a collar 123, which collar 123 is axially secured to the shaft 87. To permit actuation of the dog-type clutch 89, there is provided a support member 124 surrounding the shaft 87, which support member is fixedly mounted with respect to the housing 101 by any convenient means. Support member 124 has a fluid-actuated piston 126 slidably mounted therein, which piston axially bears against the clutch member 88 through an intermediate thrust bearing 127. The support member 124 and piston 126 define a fluid pressure chamber 128 therebetween which, when supplied with pressure fluid, causes the piston 126 to move rearwardly (rightwardly in FIG. 6) to thus cause the clutch member 88 to move into meshing engagement with the teeth 91.

The bypass clutch 89, in the illustrated embodiment, will thus be actuated by means of any suitable control system, such as a pneumatic shift control system, so that pressure fluid will be supplied to the chamber 128 whenever the range clutch 47 is also being shifted. This thus ensures that the power bypass will be positively mechanically interconnected between the input and output shaft whenever a range shift occurs. The various control systems, including pneumatic, used for controlling shifting in transmissions having a range shift section are well known, and thus further description of same is not believed necessary.

OPERATION

In reviewing the operation of the embodiment of the invention herein disclosed for illustrative purposes it will be assumed that same is installed in a road vehicle, as a truck, and that the vehicle is at a standstill with its engine running. Assuming that the operation of the vehicle is to be in the forward direction, the slider 34 of the jaw clutch system 37 will be moved rightwardly and the slider 58 of the jaw clutch system 47 will also be moved rightwardly into engagement with the clutch half 57. This movement places the range shifting unit in its low range condition and the vehicle is ready to start.

Assuming the main clutch, if there is one, to be engaged, the vehicle operation is commenced by moving the slider 72 of the clutch system 67 leftwardly to engage the clutch plates 73 with the clutch plates 66. (It is of course possible for reasons of clutch capacity and smoothness of engagement to first engage the plates 73 and 66 with the main clutch open and thereafter engage the main clutch to start the vehicle.) With the main clutch and the clutch system 67 engaged, the power flow is then from input shaft 1 and gear 2 to gear 63, and then through clutch system 67 to shaft 76. Power will then flow through the gears 77 and 44 to the shaft 43 and the gear 45, then simultaneously through the gears 41 and 48 and shafts 51 and 52 to the gear 56, and then through the engaged jaw clutch members 57 and 58 to the output shaft 61.

Second speed is attained by simultaneously releasing the engaged portion of the clutch system 67 and engaging the leftward portion, namely the portions 12 and 14, of the clutch system 15. Since the gears 33,42 and 77,44 are of different ratios, this means that some slipping of the clutch system 15 will take place during such engagement but since the ratio difference between said gear pairs is not great, such slipping can be tolerated and the power flow from the input shaft to the output shaft will continue uninterrupted. With the clutch system 67 released and the leftward side of the clutch system 15 engaged, the power flow in the second speed position is now from the input shaft 1 through the gears 2 and 7 and then through the clutch system 15 to the shaft 32. The power then flows through gears 33 and 42 to the shaft 43 and thence from the gear 45 through the gears 41 and 48 and the shafts 51 and 52 to the gear 56.

The power then flows through the engaged rightward side of the jaw clutch system 47 to the output shaft 61.

Third speed position is attained by simultaneously releasing the clutch system 15 and engaging the left side of clutch system 10. When same is accomplished, the power flow is then from the input shaft 1 through the gears 2 and 6 to the shaft 8, and then through the leftward side of the clutch system 10 to the shaft 31. The power then flows from the shaft 31 through the rightward side of the jaw clutch system 37 to the gear 41, then through the gear 45 to the gear 48. The power then flows simultaneously through the shafts 51 and 52 to the gear 56, and then through the rightward side of the jaw clutch system 47 to the output shaft 61.

Fourth speed position is attained by simultaneously releasing the clutch system 10 and engaging the rightward side of the clutch system 67. When this is accomplished the power flow will be from the input shaft 1 through the gears 3 and 68 to the shaft 69, and then through the rightward side of the clutch system 67 to the shaft 76. The power then flows in the same manner as above outlined for the first speed position from the shaft 76 through the gears 77 and 44 to the shaft 43 and the gear 45, then through the shafts 51 and 52 and the gear 56 and the rightward side of the jaw clutch system 47 to the output shaft 61.

Fifth speed position is obtained by releasing the rightward side of the clutch system 67 and simultaneously engaging the rightward side of the clutch system 15. When this is accomplished power then flows from the input shaft 1 through the gears 3 and 22 to the shaft 24 and then through the clutch plates 27 and 29 to the shaft 32. From the shaft 32 power flows in the same manner as above described with respect to the second speed position through the gears 33 and 42 to the shaft 43 and then through the gear 45 to shafts 51 and 52, thence through the gear 56 to the rightward side of the jaw clutch system 47 and to the output shaft 61.

Sixth speed position is attained by releasing the clutch system 15 and engaging the rightward side of the clutch system 10. When so engaged the power flows from the input shaft 1 through the gears 3 and 21 to the shaft 23 and then through the rightward side of the clutch system 10 to the shaft 31. From the shaft 31 power flows through the rightward side of the jaw clutch system 37 to the gear 41 and thence, as above-described in connection with the third speed position, it flows through the gears 45 and 48 and the shafts 51 and 52 to the gear 56 and then through the rightward side of the jaw clutch system 47 to the output shaft 61. This completes the six-speed sequence through the main transmission unit when the range transmission unit is in its low range position and brings the transmission to what is hereinafter called the "sixth low" condition.

In order to shift into the next speed position, it is now necessary, in a manner already known in connection with range shifting transmissions, to simultaneously shift the main transmission unit from sixth speed back to first speed and the range transmission unit from its low range position to its high range position. This double shift, or "double swap" shift, results in the transmission being in what is hereinafter referred to as its "sixth high" position. According to the invention, this "double swap" shift is carried out in the manner described hereinafter.

It should first be noted that the range relationships between the gears 2 and 81 on the one hand and the gears 93 and 62 on the other hand are such that, when the system is in the "sixth-low" speed position as above-described, the jaw clutch members 88 and 91 are traveling at speeds very close to each other with the clutch member 91 running only slightly faster than the clutch member 88. In a typical installation having an input speed of 2100 r.p.m., the jaw clutch member 88 in the "sixth-low" speed position is operating at 975 r.p.m. and the jaw clutch member 91 is operating at 1003 r.p.m. With these as the operating conditions, the jaw clutch members 88 and 91 are moved toward each other. So long as the jaw clutch member 91 is rotating more rapidly than the member 88, the teeth of member 91 will ratchet on the angled sides thereof. The rightward side of the clutch 10 is then released to relieve the torque between the teeth of the jaw clutch members 57 and 58. Immediately upon such release of torque the slider 58 of the jaw clutch system 47 is moved leftwardly sufficient to disengage the clutch teeth 57 and 58. As soon as member 91 has the same speed as member 88, members 88 and 91 will engage and the member 91 will be driven from the member 88 on the square sides of the teeth. In view of the very small difference in the speed between the members 88 and 91, it will be apparent that it will require only a slight amount of speed change on the part of the vehicle or the engine to effect such synchronism and hence the creation of a positive driving condition from the input through the jaw clutch system 89 to the output shaft normally occurs practically instantaneously following the disengagement of the rightward side of the range shift jaw clutch system 47. Thus, with the engagement of the bypass jaw clutch system 89, the power flows from input shaft 1 through the gears 2 and 81 to the shaft 87, then through the jaw clutch system 89 to the gears 93 and 62 and thence to the output shaft 61.

With the friction clutch system 10 and jaw clutch system 47 disengaged, it is now possible to return the main transmission unit to its low gear position. Accordingly the left side of the friction clutch system 67 is engaged in the manner above-described in connection with the first speed position and power flows from input shaft 1 through the gears 2 and 63 then through the leftward side of the clutch 67 to the shaft 76 and the gears 77 and 44.

Consideration must now be given to completing the shift of the range unit to its high speed (low ratio) condition whereby to complete a shift to the "sixth-high" speed, both conditions being called sixth speed because the overall speed ratio between the input shaft 1 and output shaft 61 in the "sixth-high" position is substantially the same as in the "sixth-low" position.

In the illustrated transmission, this relationship between the "sixth-high" and "sixth-low" position is achieved by providing a speed ratio of 1.0 within the main transmission unit when same is in the sixth gear position, and providing a speed ratio of 3.47 in the range transmission unit when same is in the low range position. Thus, the overall ratio of the transmission between the input and output shafts is 3.47 when the transmission is in the "sixth-low" position. On the other hand, the main transmission unit has a speed ratio of 3.47 when in the low or first gear position, and the range transmission unit has a speed ratio of 1.0 when in the high range position, so that the overall speed ratio between the input and output shafts is likewise 3.47 when the transmission is in the "sixth-high" position. Thus, the "double-swap" shift is accomplished by shifting between two different power paths connected between the input and output shafts, which power paths each provide substantially the same speed ratio.

However, in order to permit the bypass clutch system 89 to engage and positively drive the output shaft 61 during the "double-swap" shift, a slightly smaller gear ratio is provided between the input shaft 1 and the output shaft 61 by way of the clutch system 67 when in its low gear or left side position. In the specific example, the ratio through the bypass clutch system 89 is 3.54, as where the ratio from the input shaft 1 through the left side of clutch system 67 to the high range side 46 is 3.47. Thus, the speed of the leftward or high range side 46 of the range shift clutch system 47 is virtually, but not exactly synchronized with the speed of the shift member 58 when same is driven through the bypass clutch 89. The member 58 of jaw clutch system 47 may now be moved leftwardly to engage the clutch teeth of members 58 and 46, whereupon the power flow is immediately from the gear 44, driven as above mentioned, through the left side of the jaw clutch system 47 to the output shaft 61. This results in jaw clutch member 91 again rotating faster than member 88 so that the teeth of member 91 will again ratchet on the angled sides thereof, thus interrupting the bypass power flow. Jaw clutch members 88 and 91 may now be moved apart since they are not required for power flow to the output shaft 61. The shift to the "sixth-high" position is thus completed, but the ratio between the input and output shafts is the same as when the transmission was in the "sixth-low" position.

With the range shift unit remaining in the high range position (that is, the slider 58 remaining in its leftward position in the embodiment shown), the speeds from seventh through eleventh speed inclusive are provided by shifting the friction clutches 67, 15 and 10 in the same manner as above-described in connection with the second to sixth ratios inclusive.

Down shift sequences are obtained by reversing the above-described sequence from "sixth-high" through eleventh speed in an obvious manner. "Sixth-high" to "sixth-low" is essentially a reverse of the progression above-described from sixth-low to sixth-high. Specifically, the bypass jaw clutch members 88 and 91 are moved together. Because of the slightly greater ratio referred to above in connection with the power path through the bypass jaw clutch as compared to that through shaft 76, the clutch member 91 of the jaw clutch system is rotating slightly faster than the clutch member 88 so that the teeth of clutch system 89 ratchets. Releasing the left side of clutch system 67 removes the torque from the left side of the range shift jaw clutch system 47 so that the member 58 may be moved rightwardly into neutral position. This allows member 91 to slow relative to member 88 and hence be driven by member 88. This now provides positive drive from input shaft 1 to the output shaft 61 in the above-described manner and maintains the system substantially at the speed of the sixth gear position while the remainder of the shift sequence takes place.

During the remainder of the shift sequence when down-shifting from "sixth-high" to "sixth-low," the right side of friction clutch 10 is engaged which thus results in the input shaft 1 being drivingly interconnected to the low range side 57 of the jaw clutch 47 by means of the intermediate shafts 31 and 51 and the gears 53 and 56. As explained above, this power path has a speed ratio slightly less than the ratio through the bypass clutch, such as a ratio of 3.47 in comparison to a ratio of 3.54 through the bypass clutch 89. Thus, the jaw clutch slider 58 when in its neutral position is being rotated at a speed similar to but slightly greater than the speed of the low range clutch member 57. Thus, the clutch slider 58 is almost immediately in speed synchronization with the clutch member 57 and will thus move into engagement with the member 57 to thus drivingly connect the output shaft 61 to the input shaft 1 through the right side of the friction clutch system 10. The "sixth-low" speed position is thus achieved. This results in jaw clutch member 91 rotating more rapidly than member 88 so that the teeth of member 91 will ratchet on the angled sides thereof, thus interrupting the bypass power flow. Jaw clutch members 88 and 91 may now be moved apart since they are not required for power flow to the output shaft 61. Further downshifting from "sixth-low" to "first" is then the reverse of the above-described corresponding upward progression.

It will be noted that with the system herewith set forth these is during the step of synchronizing the shifting portions of the range shift jaw clutch system a positive connection between the input shaft and the output shaft so that there is no longer the necessity for minimizing the time during which synchronizing is achieved between the range shifting components. Hence, the synchronizers, if any are provided for such purpose, may be relatively small. Alternatively and equally practical is the fact that since the components to which the slider 58 of the range shifting jaw clutch system 47 are engaged are driven mainly by friction clutches, and since they are driven at speeds very closely approximating synchronization with said slider 58, no synchronizers at all will be needed in the range shift unit and hence this source of considerable expense, length and maintenance problems is eliminated.

MODIFICATIONS

Figure 7:
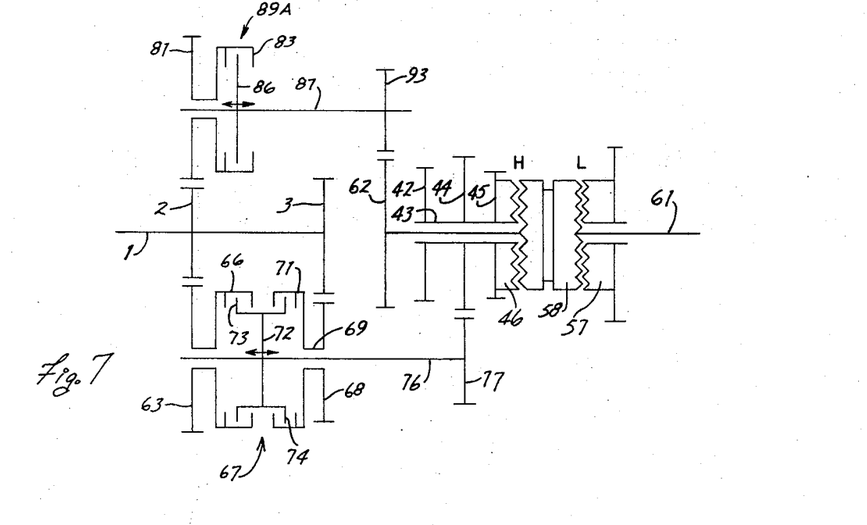
FIGS. 7–9 are sectional schematic views similar to FIG. 2 and illustrating therein variations of the present invention.

In FIG. 7 there is indicated a modification wherein the jaw clutch system 89 of the above-described unit is replaced by a friction clutch system 89A. Since the operation thereof is the same as above-described in connection with the jaw clutch system 89, a further description of either the structure or operation of the unit embodying this modification is not believed necessary. However, it will be recognized that the use of a friction clutch at this point provides some advantages as regards the speed of operation and the lack of need for synchronism to cause engagement of the clutch components in the bypass system, but it has the diadvantage that, unless a very large friction clutch is used, there is some chance for slippage under a heavy load.

Obviously other types of clutches, such as magnetic or eddy current clutches, may also be used at this point if desired but with advantages or disadvantages according to their own particular operational characteristics which will be apparent to persons acquainted with apparatus of this type in light of the foregoing discussion, but particularly in light of the comment abve made with respect to the substitution of a friction clutch 89A in place of the jaw clutch 89.

Likewise while the double clutch units 10, 15 and 67 are indicated as friction clutches, it will be recognized that they may be of other conventional types, such as eddy-current clutches, magnetic clutches or under some circumstances they could even be dog-tooth clutches, provided that in this latter case they are combined with adequate synchronizers.

Figure 8:
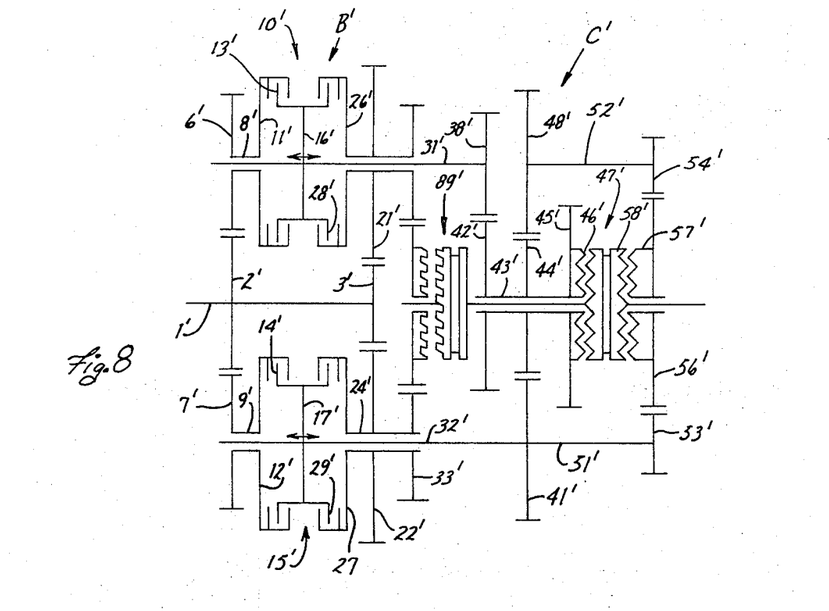
Figure 9:
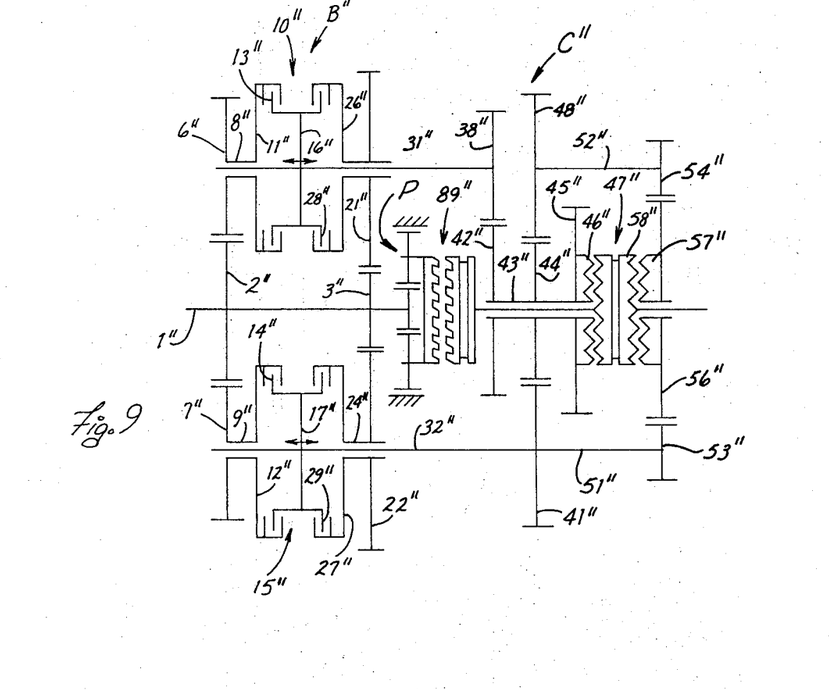

Although in the illustrated embodiment the power bypass is positioned externally of the shifting system, it will be understood by those skilled in the art that this is primarily for convenience in illustration and for convenience in the manufacture of the prototype from which the drawings were taken. However, in the light of the foregoing discussion it will be recognized that the power bypass is primarily a system having power disconnect means therein together with ratio means for connecting selected portions of the transmission system, in this case for connecting the input and output shafts thereof. Thus, other means may be utilized comprising ratio means and power interrupting means for connecting such selected portions of the transmission system such as the input shaft 1 and the portion 61a of the output shaft 61 which alternate means may be of a wide variety and capable of ready selection of those skilled in the art. For example, as shown in FIG. 8 (wherein corresponding parts are single primed and will need no separate discussion), the bypass clutch means 89' may be positioned coaxially with said input and output shafts, driven directly by one thereof and connected through suitable ratio means to the other thereof. Alternatively, as shown in FIG. 9 (wherein corresponding parts are double primed), the arrangement can include planetary means P wherein the clutch means 89'' are connected to one of said input and output shafts and the sun gear of the planetary means is connected to the other thereof.

It will be further apparent that the broad aspects of the invention will be entirely effective with a wide variety of designs for the main transmissions unit of the system and with an equally wide variety of design for the range shifting portion of the transmission. However, it will also be apparent that the network aspects of the invention are intimately related to the particular design of the transmission components, both the main transmission unit and the range unit, and that the advantages of the entire device are the product of the particular features, including the ratio relationships abovementioned, set forth in the disclosed embodiment.

Within the limits above-described it will be recognized by those skilled in the art that still other modifications may be made with respect to the specific embodiments herein shown and that such embodiments will be included in the scope of the claims excepting as the claims may by their own limitations require otherwise.

The embodiments of the invention in which an exclusive property or privilege is claimed are defined as follows:

1. In a range shifting transmission including a first shiftable transmission unit having ratio means defining a series of steps and a second shiftable transmission unit serially connected to said first unit and having ratio means defining at least one step which is substantially equal to the spacing between said series of steps in said first unit, the combination comprising:

bypass means including releasable power transmitting means spanning said second unit and at least said series of steps of said first unit;
means effecting power transmission by said power transmitting means when said second unit is in a neutral position and discontinuing such power transmission through said power transmitting means when said second unit is in a driving position;
whereby a positive flow of power can be obtained through said transmission during the shifting sequence of said second unit.

2. In a transmission system, the combination comprising:

a first shiftable gear group having a plurality of progressively selectable gear ratios;
a second gear group serially connected to said first gear group and having at least two selectable gear ratios, the spacing of said two gear ratios being substantially similar to a selected one of the gear ratios in the said first gear group in order that a range shifting operation may be performed in said second gear group on the attainment of said selected gear ratio in the shift progression of said first gear group;
a bypass device including power stop means connecting the gears of said selected ratio in said first gear group with the output of said second gear group; and
means closing said power stop means when the power flow through said second gear group is interrupted and opening said power stop means during conditions of power flow through said second gear group;
whereby a positive transmission of power may take place from said selected gear ratio in said first gear group through the output of said transmission during a shifting sequence in said second gear group.

3. In a transmission system, the combination comprising:

a first shiftable gear group having a plurality of progressively selectable gear ratios;
a second gear group serially connected to said first gear group and having at least two selectable ratios, the spacing of said two ratios being substantially similar to the step between a selected first and a selected second of the gear ratios in the said first gear group;
control means for range shifting said second gear group on the attainment of said second selected ratio in the shift progression of said first gear group and substantially simultaneously shifting said first gear group from said second selected ratio to said first selected ratio in said shift progression;
a bypass device including power stop means connecting the gears of said second selected ratio in said first gear group with the output of said second gear group; and
means effecting transmission of power through said power stop means when the power flow through said second gear group is interrupted and discontinuing transmission of power through said power stop means during conditions of power flow through said second gear group;
whereby a positive flow of power may be obtained through said transmission during a condition of simultaneous shifting of said second gear group and said selected gear ratios in said first gear group.

4. A transmission system according to claim 3, wherein said second selected ratio in said first gear group is the highest speed ratio therein.

5. A transmission system according to claim 3, wherein said bypass device is driven from the input of said first gear group and independent of any of the ratios therein.

6. A transmission system according to claim 3, including ratio means in said bypass device to cause the two sides of said power stop means to be driven at substantially synchronous rates of speed when the shiftable portions of said second gear group are running at substantially synchronous rates of speed.

7. A transmission system according to claim 3, wherein the power stop means comprises jaw clutch means.

8. A transmission system according to claim 3, wherein said power stop means is a jaw clutch having teeth whose respective surfaces on the driving sides thereof are perpendicular to the direction of rotation and whose teeth surfaces on the opposite sides thereof are at a non-perpendicular angle to said direction of rotation; and said bypass device including ratio means so related to the ratio of said second selected ratio that the side of the power stop means connected to the transmission output will, when said second gear group is at least substantially synchronized, be driven at a rotational speed slightly faster than the side of said power stop means connected to the input of said transmission;

whereby opening of the power train through the second gear group will permit a momentary slowing of the transmission output relative to the transmission input and initial ratcheting of said jaw clutch followed by positive engagement thereof.

9. The device of claim 3 wherein the power stop means is a friction clutch.

10. A transmission system according to claim 3, wherein said second selected ratio in said first gear group is the highest speed ratio therein; and wherein said bypass device is driven at its one end from the input of said first gear group and is connected at its other end to the output of said second gear group.

11. A transmission system according to claim 10, wherein the ratio between the lowest and highest speeds of the first gear group is slightly less than the speed ratio between the driven side of said power stop means and the output of said second gear group.

12. In a transmission system, the combination comprising:
a. a multi-speed main transmission unit providing a plurality of progressively selectable gear ratios and including
1. an input shaft having at least one input gear thereon, and
2. a plurality of countershafts arranged around said input shaft and selectably clutchable thereto at different ratios, each of said countershafts driving one of a plurality of coaxially mounted output gears;
b. a range shift unit serially connected with said main unit and including
1. means defining power delivery paths at first and second ratios and clutch means for selecting one of said paths, and
2. means connecting the input for both of said paths to said coaxially mounted output gears;
c. bypass means driven from said input shaft of said main transmission unit and connected to the output shaft of said range unit, said bypass means including power stop means; and
d. means interrupting said power stop means substantially when power is being transmitted by one of said paths through said range unit and for connecting said power stop means substantially when both of said paths are interrupted, whereby during a range shift of the transmission power will continue to be transmitted positively therethrough.

13. In a transmission having a main transmission unit and a range shift unit connected in series, the main transmission unit having a plurality of different ratio power paths each containing ratio gears, the range unit also having first and second power paths each having a different speed ratio, said range shift unit also having shiftable clutch means alternately engageable with either the first or second power path, and input and output shafts having said main transmission unit and said range unit drivingly connected in series therebetween, comprising the improvement wherein a power transmitting bypass means is automatically connectible between said input and output shafts substantially when said clutch means of said range unit is in a neutral disengaged position whereby said bypass means results in continued power transmission between said input and output shafts during shifting of said range unit, said bypass means including releasable torque transmitting means which is automatically released to discontinue the power flow through said bypass means substantially when said clutch means of said range unit is engaged with one of said first and second power paths.

14. A transmission according to claim 13, wherein said plurality of power paths in said main transmission unit includes a first power path having the greatest speed ratio thereacross and a second power path having the smallest speed ratio thereacross, the difference in the speed ratios between said first and second power paths in said main transmission unit being substantially equal to the difference in the speed ratios between said first and second power paths in said range unit.

15. A transmission according to claim 13, wherein each of the power paths in said main transmission unit also has releasable clutch means associated therewith, and said bypass means bypassing both the clutch means in said range unit and the clutch means in said main transmission unit for permitting continued power transmission between the input and output shafts when shifting is simultaneously being performed in both the main and range transmission units.

16. In a range shifting transmission, the combination including:
a plurality of substantially parallel shafts including an input shaft, an intermediate shaft and an output shaft, said input shaft being drivingly connected to an engine of a vehicle;
a main transmission unit shiftable through a series of steps and drivingly connected between said intermediate shaft and one of said input and output shafts, said main transmission unit including a plurality of interruptable power paths between said one shaft and said intermediate shaft with said plurality of power paths being of different ratios;

a second transmission unit shiftable through at least one step and drivingly connected between said intermediate shaft and the other of said input and output shafts, said second transmission unit including at least two interruptable power paths of substantially different ratios connected between said intermediate shaft and said other shaft;

said second transmission unit including shift means associated therewith for shifting of said second transmission unit between said two power paths only when said first transmission unit is being shifted out of or into its highest ratio power path during upshifting and downshifting of the transmission, respectively;

an interruptable bypass system drivingly disposed in parallel with said second transmission unit and at least a portion of said first transmission unit for permitting substantially continuous flow of power from said input shaft to said output shaft during shifting of said second transmission unit, said bypass system including an interruptable power transmitting means; and means for effecting power transmission by said power transmitting means during shifting of said second transmission unit and for discontinuing power transmission by said power transmission means when said second unit is in a driving position.

17. A transmission according to claim 16, wherein the power paths associated with one of said first and second transmission units includes gear means drivingly connected to and continuously rotated with said input shaft whenever said input shaft is rotated.

18. In a range shift transmission connectible between input and output shafts and including a first shiftable transmission unit drivingly connected to one of said shafts and a second shiftable transmission unit serially connected between said first unit and said other shaft;

said first unit incuding means defining a plurality of interruptable power paths each providing a different speed ratio between the input and output of said first unit, and shifting means associated with said power paths for permitting a selected one of said power paths to be used for transmitting power through said first transmission unit, said shifting means in association with said power paths causing said first transmission unit to have a series of progressive shifting steps;

said first transmission unit further including a gear fixed to and rotatable with said one shaft, and a plurality of countershafts parallel with said one shaft and each having a further gear associated therewith and disposed in continuous meshing engagement with said first-mentioned gear, said further gears being associated with said power paths whereby at least a portion of said power paths is rotated whenever said one shaft rotates;

said second transmission unit including at least two interruptable power paths for drivingly interconnecting said other shaft and said first transmission unit, said two power paths each having ratio means associated therewith but of different ratios so as to define a shifting step therebetween, the ratio difference associated with the shifting step of said second transmission unit being substantially greater than the ratio difference associated with any individual shifting step of said first transmission unit; and an interruptable bypass system disposed in parallel with said first and second transmission units and drivingly connectible between said input and output shafts for effecting substantially continuous flow of power between said shafts during shifting of said second transmission unit, said bypass system including a releasable power transmitting means associated therewith and capable of transmitting power therethrough whenever said second transmission unit is shifted.

* * * * *